Patented Aug. 1, 1933

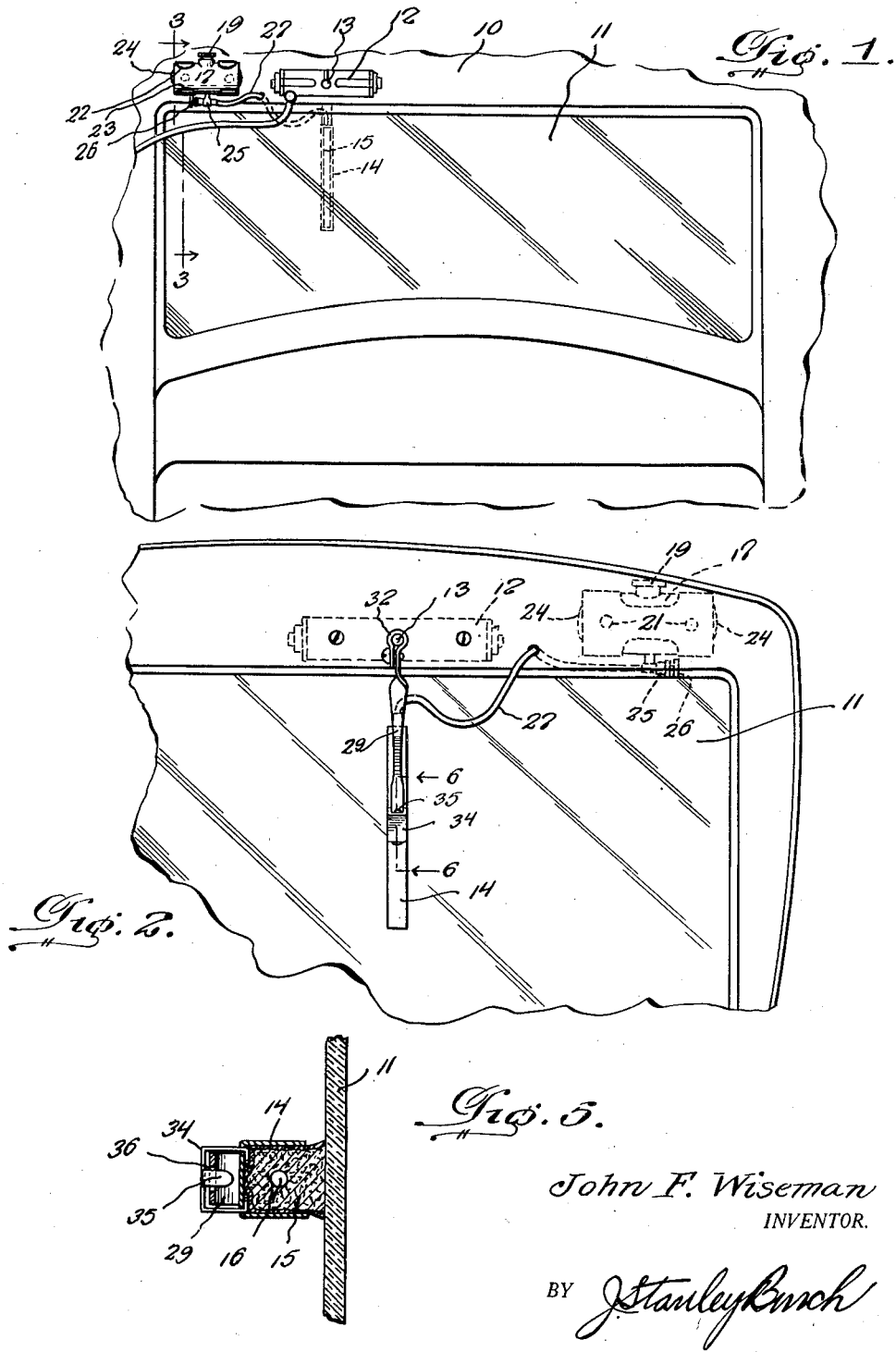

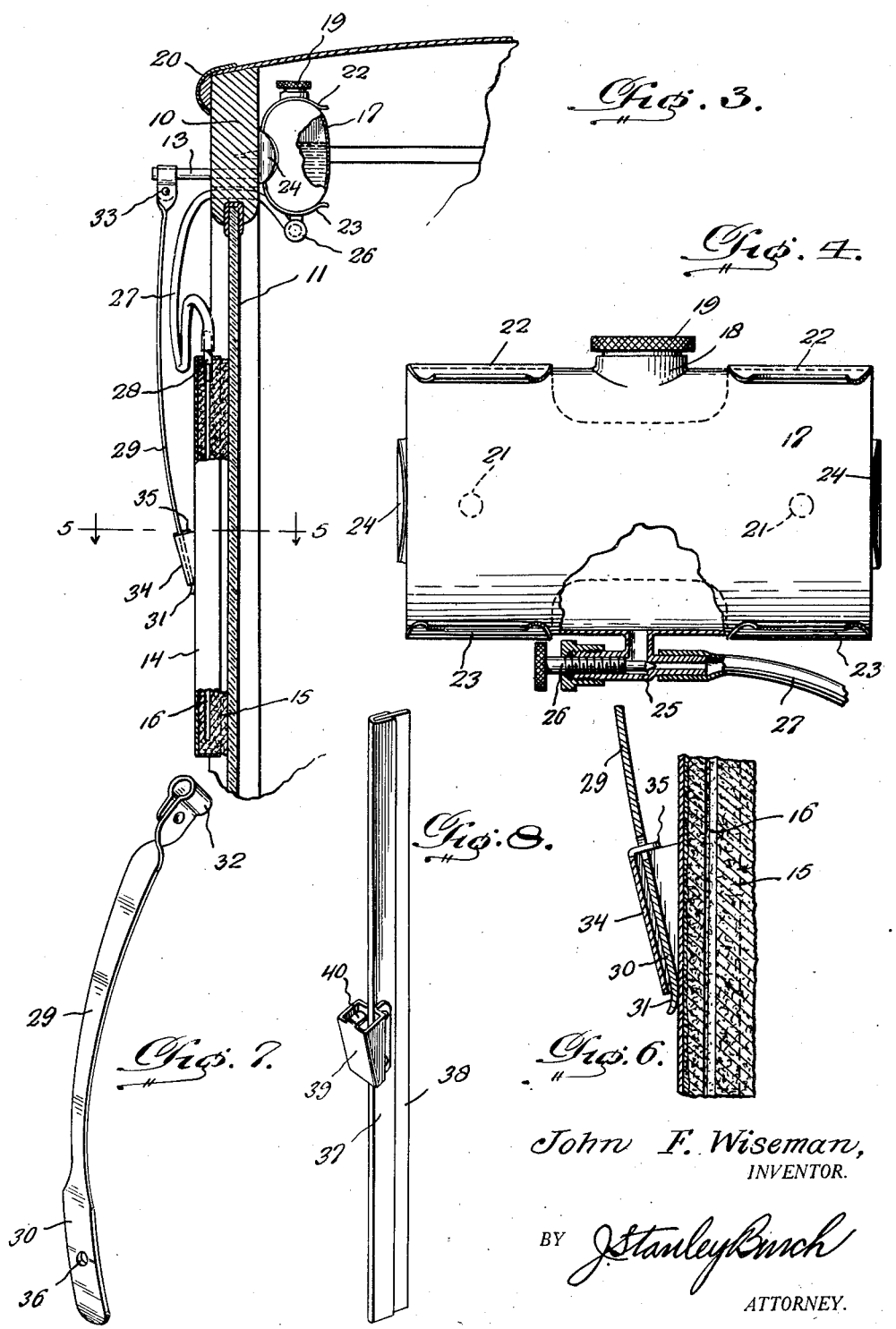

1,920,730

UNITED STATES PATENT OFFICE 1,920,730

WINDSHIELD WIPER

John F. Wiseman, Dorchester, Mass.

Application June 12, 1931. Serial No. 543,956

3 Claims. (Cl. 15—250)

This invention relates generally to windshield wipers, and has for one of its chief characteristics, the provision of a wiper which is maintained in a moistened condition, with an antifreeze solution, so that the accumulation of snow, ice, hail, mist, etc. on the windshield is positively prohibited.

In carrying out my invention, I comprehend the provision of a novel construction of means for supplying the wiping element with an antifreeze solution for the above-mentioned purpose, together with means for regulating the supply as the occasion might require.

Another important object resides in the provision of a windshield wiper characterized by a longitudinal bore extending throughout the major portion of its length, to receive the anti-freeze solution, and constructing said wiper of soft flexible material having only one porous side through which said solution can escape from the bore, to be effectively applied to the windshield.

A further object of the invention resides in the provision of a windshield wiper of the above-mentioned character, in the nature of an accessory, constructed to permit of the same being quickly and conveniently associated with or removed from any type or make of machine.

A still further object of the invention resides in the provision of a windshield wiper, including an operating arm constructed to be easily attached to or removed from its operating shaft, and capable of interchangeable use with wipers of different constructions.

Other objects and advantages will appear when the following detail description is read in connection with the accompanying drawings, the invention residing in the construction, combination and arrangement of parts as claimed.

In the drawings forming part of this application, like numerals of reference indicate similar parts in the several views, and wherein:

Figure 1 is a fragmentary front elevation of a vehicle, showing the invention mounted for use, and looking from the inner side of the windshield.

Figure 2 is a similar view looking from the outer side of the windshield.

Figure 3 is a section taken on line 3—3 of Figure 1.

Figure 4 is a view in elevation, and partly in section, of the anti-freeze solution receptacle and holder therefor.

Figure 5 is a section taken on line 5—5 of Figure 3.

Figure 6 is a section taken on line 6—6 of Figure 2.

Figure 7 is a perspective view of the detachable operating arm.

Figure 8 is a view of another form of wiper, and with which the operating arm shown in Figure 7 is capable of being used.

Referring to the drawings in detail, 10 indicates generally a portion of a vehicle having a windshield 11. The windshield wiper embodies any ordinary well known operating means indicated at 12 and including an operating shaft 13. The present invention is constructed to be conveniently attached to or removed from the operating shaft 13 of any operating means for the purpose intended.

The windshield wiper constituting the subject matter of the present invention, comprises an elongated holder 14 of channel-like formation in cross section, and closed at both ends as clearly illustrated in Figure 3. This holder receives and supports the wiping element 15, which may of course be constructed from any suitable material, but which is preferably constructed from a piece of sponge rubber having a longitudinal bore 16 extending throughout the major portion of its length. As clearly illustrated in Figure 5, the wiping element is so constructed that it is sealed about three sides, and has only one open porous side which lies adjacent the windshield 11 in contacting engagement therewith. The purpose of this construction is to prevent the escape of an anti-freeze solution, which is conveyed to the bore 16 in a manner to be presently described, except through the porous side of the wiping element, so that it can be effectively applied to the windshield 11.

Suitably supported upon the vehicle directly above the windshield 11 is a container 17 adapted to contain an anti-freeze solution. The container may of course be constructed from any suitable material and also vary in size and configuration without departing from the inventive idea, but it is preferably of substantially cylindrical contour in cross section as illustrated in Figure 3, and is provided with a filling neck or opening 18 which is normally closed by a removable closure or plug 19. This plug is provided with a vent to enable the solution to flow freely from the container to the wiping element 15. The container 17 is preferably associated with a suitable bracket formed from a single piece of resilient metal having a configuration corresponding to the curvature or shape of the container 17. This bracket is indicated generally at 20 and is provided with openings 21 to receive suitable fastening elements for tacking the bracket to the vehicle 10. The upper and lower portions of this bracket are cut away to define resilient tongues 22 and 23 which embrace the upper and lower portions of the container 17, while the ends of the bracket are also formed with resilient tongues 24 which engage the adjacent ends of the container 17 as clearly shown in Figure 4. The neck 18 of the receptacle is arranged between the tongues 22, while depending from the bottom of the container between the tongues 23 is a valve casing indicated generally at 25, which communicates with the container 17, and which accommodates a needle valve indicated at 26. Associated with one end of the valve casing 25 is a flexible tube 27 through which the anti-freeze solution is conveyed from the container 17 to the bore 16 of the wiping element. Arranged in the upper end of the wiper is a hollow tubular member 28 which is partly embedded in the wiping element and partly projecting above the upper end of the holder and received by the adjacent end of the tube 27. The type of wiper hereinabove described, is preferably used during the cold season, and is supplied with an anti-freeze solution which maintains the wiping element 15 in a moistened condition, so that incident to the operation of the wiper, the windshield is kept free from the accumulation of snow, ice, hail, mist, etc. Manifestly the solution is fed to the wiping element 15 from the container 17 by gravity, and is conveyed through the tube 27 into the bore 16 of said element. The flow of the solution to the wiping element can be regulated or controlled by a proper adjustment of the needle valve 16. When the solution has been introduced into the bore 16 of the wiping element, it cannot escape therefrom except through the open or porous side thereof, which lies in contacting engagement with the windshield 11.

As hereinabove stated, the wiper is operated in any ordinary well known manner, by an operating means indicated generally at 12, the shaft 13 of which has associated therewith an operating arm 29. This arm is preferably of the construction as clearly illustrated in Figure 7, being formed from a piece of resilient metal, closed longitudinally throughout its length, and having a relatively broad lower portion 30 which terminates in an outwardly curved extremity 31 to provide a fulcrum point for the arm, incident to its association with the holder or its removal therefrom. The upper end of this arm is twisted to be arranged substantially at a right angle to the arm itself, and terminates to provide a sleeve-like portion 32 adapted to be mounted upon the shaft 13 and held fixed thereto by a suitable fastening element 33.

Carried by the holder 14 of the wiper is a socket member 34, which is substantially V-shaped in cross section and open at both ends. The relatively broad lower portion 30 of the arm is received by the socket, and passes through the lower end thereof, so that the fulcrum point 31 thereof engages the holder 14 and exerts a pressure against the latter to hold the wiper in effective contacting engagement with the windshield 11. Projecting inwardly from the upper end of the socket member 34 is a lug 35 which is received by a suitable opening 36 formed in the lower portion of the arm 29, which construction holds the arm 29 and the wiper associated for use, but at the same time permits the arm to be quickly and easily associated with or separated from the holder as the occasion may require.

Inasmuch as the use of the anti-freeze solution is not so necessary or desirable during the warmer weather, the invention contemplates the use of a windshield wiper of the character illustrated in Figure 8, including a holder 37 and a wiping element 38. The holder 37 has associated therewith a socket member 39 of the same character hereinabove described, including a lug 40 projecting inwardly from the upper end thereof. In accordance with the present invention, the operating arm 29 is capable of being interchangeably used with either the wiper illustrated in Figure 3 or the wiper illustrated in Figure 8, and with this object in view, the operating arm 29 is constructed to be easily and quickly separated from the operating shaft 13, and used with either type of wiper, the arm 29 in both instances being associated with the wiper through the instrumentality of the socket members in the manner above stated.

While it is believed that from the foregoing description the nature and advantages of the invention will be readily apparent, I desire to have it understood that I do not limit myself to what is herein illustrated or described, and that such changes may be resorted to when desired as fall within the scope of what is claimed.

What I claim as new is:

1. A windshield wiper including a holder, a wiping element received thereby, a substantially U-shaped socket member receiving the holder and having a relatively large upper end and a relatively restricted lower end, said socket being open at both ends, a lug projecting inwardly from one wall of the socket at the upper end thereof, and a curved resilient operating arm having one end passed through the socket and bearing against the holder, said arm having an opening in its length to receive said lug.

2. In a windshield wiper, the combination of a relatively wide U-shaped holder of elongated form, and a relatively wide bar-like wiping element of molded porous material snugly fitted in and projecting outwardly beyond the sides of said holder, said wiping element being of uniform substantially rectangular form in cross section and having a longitudinal bore opening through one end of said element and closed at the other end thereof, and means to supply an anti-freeze solution to said bore.

3. In a windshield wiper, the combination of a relatively wide U-shaped holder of elongated form, and a relatively wide bar-like wiping element of molded porous material snugly fitted in and projecting outwardly beyond the sides of said holder, said wiping element being of uniform substantially rectangular form in cross section and having a longitudinal bore opening through one end of said element and closed at the other end thereof, means to supply an anti-freeze solution to said bore, and means sealing the pores of said wiping element at the inner and lateral sides thereof.

JOHN F. WISEMAN.